United States Patent
Yasufuku et al.

(10) Patent No.: US 10,294,595 B2
(45) Date of Patent: May 21, 2019

(54) POLYMER NANOFIBER SHEET AND METHOD FOR PRODUCING THE SAME

(71) Applicant: CANON KABUSHIKI KAISHA, Tokyo (JP)

(72) Inventors: Kaori Yasufuku, Kawasaki (JP); Tetsuo Hino, Yamato (JP); Kenji Takashima, Numazu (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 14/879,227

(22) Filed: Oct. 9, 2015

(65) Prior Publication Data

US 2016/0108192 A1 Apr. 21, 2016

(30) Foreign Application Priority Data

Oct. 21, 2014 (JP) ................................. 2014-214426

(51) Int. Cl.
*D04H 1/04* (2012.01)
*C08J 5/18* (2006.01)

(52) U.S. Cl.
CPC . *D04H 1/04* (2013.01); *C08J 5/18* (2013.01)

(58) Field of Classification Search
CPC ................................ Y10S 428/903; C08J 5/18
USPC ....................................................... 428/903
See application file for complete search history.

(56) References Cited

U.S. PATENT DOCUMENTS

| | | | |
|---|---|---|---|
| 2010/0203787 A1* | 8/2010 | Steele | B29C 70/465 442/181 |
| 2011/0226697 A1* | 9/2011 | McLellan | B01D 53/62 210/651 |
| 2015/0218324 A1 | 8/2015 | Hino et al. | |
| 2015/0273366 A1 | 10/2015 | Takashima et al. | |
| 2015/0273377 A1 | 10/2015 | Takashima et al. | |
| 2015/0273812 A1 | 10/2015 | Takashima et al. | |

FOREIGN PATENT DOCUMENTS

| | | | |
|---|---|---|---|
| CN | 103225133 A | * | 7/2013 |
| CN | 102561037 B | * | 8/2013 |
| JP | 2010-84252 A | | 4/2010 |
| JP | 2011-214170 A | | 10/2011 |

OTHER PUBLICATIONS

Hansen, C., Hansen Solubility Parameters. Jun. 2007, pp. 1-26.*

(Continued)

*Primary Examiner* — Peter Y Choi
(74) *Attorney, Agent, or Firm* — Venable LLP

(57) ABSTRACT

A polymer nanofiber sheet including polymer nanofibers having a polymer, the polymer nanofibers being accumulated and three dimensionally entangled. The polymer nanofiber sheet has a low molecular weight organic compound containing at least one 4- or higher-membered ring structure with an ether linkage. The difference between the average solubility parameter of the polymer and the average solubility parameter of the low molecular weight organic compound is less than 8 $(J/cm^3)^{1/2}$.

5 Claims, 2 Drawing Sheets

(56) References Cited

OTHER PUBLICATIONS

Zhang, Miscibility Evaluation of Nylon 66/Nylon 6 Blends Investigated by Crystallization Dynamics, Journal of Thermal Analysis and Calorimetry, vol. 85 (2006) 3, 707-712 (Year: 2006).*
Tietze, Advanced Benzoxazine Chemistries Provide Improved Performance in a Broad Range of Applications, Handbook of Benzoxazine Resins. DOI: 10.1016/B978-0-444-53790-4.00079-5 pp. 595-604 (Year: 2011).*
Agag, Tarek et al, "Crosslinked Polyamide Based on Main-Chain Type Polybenzoxazines Derived from a Primary Amine-Functionalized Benzoxazine Monomer," Polymer Chemistry 2011, vol. 49, pp. 4335-4342. (Year: 2011).*
Machine Translation for JP 2010-084252. (Year: 2010).*
Takashima et al., U.S. Appl. No. 14/837,886, filed Aug. 27, 2015.
Hino et al., U.S. Appl. No. 15/006,334, filed Jan. 26, 2016.
Charles M. Hansen, "Hansen Solubility Parameters: A User's Handbook, Second Edition," pp. 95-111 (Jun. 2007).

* cited by examiner

POLYMER NANOFIBER SHEET AND METHOD FOR PRODUCING THE SAME

BACKGROUND OF THE INVENTION

Field of the Invention

The present invention relates to a polymer nanofiber sheet and a method for producing the polymer nanofiber sheet.

Description of the Related Art

In recent years, polymer nanofiber structures typified by polymer nanofiber sheets have been drawing attention as materials having large specific surface areas. In such structure, nanofibers having a polymer are accumulated and thus are three dimensionally entangled with each other.

However, in the conventional polymer nanofiber structures formed from three dimensionally entangled polymer nanofibers, the fibers are simply, physically entangled with each other. Such a structure has low mechanical strength, is likely to be damaged by tensile force or friction, and is insufficient for practical applications. To address this problem, techniques for improving the mechanical strength of the polymer nanofiber structures have been developed. Japanese Patent Application Laid-Open No. 2011-214170 discloses a technique of performing a partial bonding treatment. In this technique, a thread-shaped polymer nanofiber structure formed by twisting a plurality of polymer nanofibers are heated, and thus the polymer nanofibers are partially bonded to each other. According to Japanese Patent Application Laid-Open No. 2011-214170, the partial bonding treatment enables production of a polymer nanofiber structure having higher strength. Separately, Japanese Patent Application Laid-Open No. 2010-84252 discloses a technique for improving the strength of a laminate including polymer nanofibers by joining at least some of the polymer nanofibers included in the laminate through a crosslinkable substance and discloses a waterproof moisture-permeable laminate produced by this technique.

However, for the technique of Japanese Patent Application Laid-Open No. 2011-214170, it is difficult to control the temperature suitable for partial bonding of polymer nanofibers, for example. Depending on conditions, nanofibers are greatly melted to form a structure that includes fibers having a diameter of several micrometers or more, in some cases. Accordingly, the resulting nanofiber structure itself may have a lower specific surface area. For the technique of Japanese Patent Application Laid-Open No. 2010-84252, such a problem that a crosslinkable substance is detached from a fiber base material during a crosslinking treatment arises depending on the correlation between the fiber base material used and the crosslinkable substance. In addition, depending on the crosslinkable substance, a structure having sufficient strength may not be obtained in some cases.

SUMMARY OF THE INVENTION

In order to solve the above-described problem, the present invention has an object of providing a polymer nanofiber sheet having high detachment strength and mechanical strength and also having a large specific surface area.

That is, the present invention provides a polymer nanofiber sheet including polymer nanofibers having a polymer, the polymer nanofibers being accumulated and three dimensionally entangled. The polymer nanofiber sheet has a low molecular weight organic compound containing at least one 4- or higher-membered ring structure with an ether linkage. The difference between the average solubility parameter of the polymer and the average solubility parameter of the low molecular weight organic compound is less than 8 $(J/cm^3)^{1/2}$.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention pertains to a polymer nanofiber sheet in which polymer nanofibers having a polymer are accumulated and three dimensionally entangled. The polymer nanofiber sheet according to the present invention has a low molecular weight organic compound containing at least one 4- or higher-membered ring structure with an ether linkage (—O—). Here, "having a low molecular weight organic compound" is not limited to embodiments in which the low molecular weight organic compound is present to adhere to the inside or the surface of the polymer nanofibers constituting the polymer nanofiber sheet. This also includes embodiments in which the low molecular weight organic compound is fixed to the inside or the surface of the polymer nanofibers through covalent bonds or the like. In the description below, the low molecular weight organic compound containing at least one 4- or higher-membered ring structure with an ether linkage may also be referred to simply as a low molecular weight organic compound.

In the present invention, the difference between the average solubility parameter of the polymer and the average solubility parameter of the low molecular weight organic compound is less than 8 $(J/cm^3)^{1/2}$.

The polymer nanofiber sheet of the present invention will now be described with reference to drawings.

Polymer Nanofiber Sheet

Figure 1A:
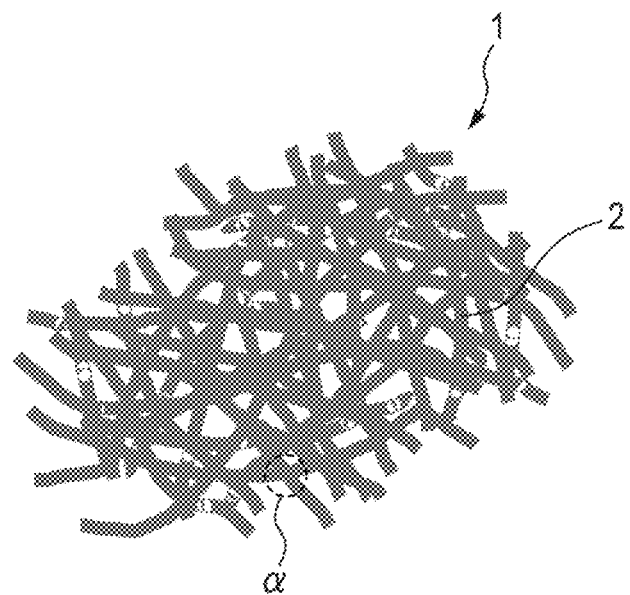
FIGS. 1A and 1B are schematic views illustrating an illustrative embodiment of a polymer nanofiber sheet of the present invention.
Figure 1B:
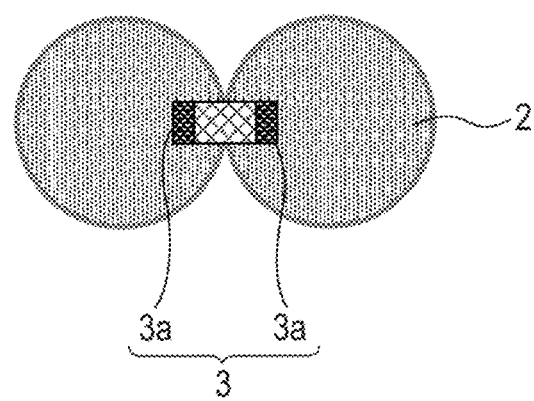

FIGS. 1A and 1B are schematic views illustrating an embodiment example of a polymer nanofiber sheet of the present invention. FIG. 1A is a schematic view of the sheet, and FIG. 1B is an enlarged sectional view of the part α in FIG. 1A. The polymer nanofiber sheet 1 in FIGS. 1A and 1B is a sheet-shaped structure in which a plurality of polymer nanofibers 2 are accumulated and three dimensionally entangled. The polymer nanofiber sheet of the present invention is composed of the polymer nanofibers in this manner, and accordingly appropriate spaces are formed among the plurality of polymer nanofibers 2 entangled with each other. Thus, the polymer nanofiber sheet of the present invention naturally has a high specific surface area.

The polymer nanofiber sheet of the present invention, as shown in FIG. 1B, includes the polymer nanofibers 2 and a crosslinked part 3 for connecting the polymer nanofibers 2 to each other. The crosslinked part 3 is mainly formed by chemical reaction between a polymer and a low molecular weight organic compound of the polymer nanofiber sheet 1.

In other words, the molecular weight organic compound included in the polymer nanofiber sheet of the present invention is present in such a mode that the organic compound is fixed to the inside or the surface of the polymer nanofibers through covalent bonds or the like. Actually, in addition to the chemical crosslinking formed by the chemical reaction, physical crosslinking formed by the association between the polymer and the low molecular weight organic compound can also be included, but the crosslinking is intended to mean the chemical crosslinking in the description below unless otherwise stated.

When the crosslinked part 3 is formed from the low molecular weight organic compound to form a crosslinking portion 3a through the chemical crosslinking, the crosslinked part 3 is to have a flexible joining structure due to an $sp^3$ hybrid orbital (oxygen atoms, methylene groups, for example), which is excellent in molecular rotation. Accordingly, the crosslinked part 3 is a partial structure that is not brittle and is flexible. The mode of the chemical crosslinking through the crosslinked part 3 is not limited to such a crosslinking state that the polymer nanofibers 2 are in contact with each other as illustrated in FIG. 1B. For example, such a crosslinking mode that nanometer-order clearances are provided between the polymer nanofibers 2 is also included. Crosslinking between plural (at least two) polymer chains constituting a single polymer nanofiber 2 is also included.

As described above, the crosslinked parts are appropriately provided in the nanofibers or between the nanofibers in the polymer nanofiber sheet of the present invention. On this account, the polymer nanofiber sheet of the present invention has high mechanical strength and high detachment strength between polymer nanofibers, and the polymer nanofibers are unlikely to cause detachment or exfoliation due to an external factor such as friction. In the polymer nanofiber sheet of the present invention, the polymer nanofibers are unlikely to cause detachment or exfoliation, and thus the specific surface area of the polymer nanofiber sheet is not reduced by the above external factor. The specific surface area of the polymer nanofiber sheet depends on the fiber diameter and the number of polymer nanofibers exfoliation the sheet, and thus those parameters can be appropriately set in accordance with intended characteristics.

A quantitative indication of a local structure of the nanofiber sheet includes an abundance represented by the proportion of the volume of polymer nanofibers with respect to the volume (including void areas) of the sheet. The abundance has a plurality of definitions, which differ in the calculation method of the volume proportion of polymer nanofibers. The abundance specifically includes a unit abundance and an average abundance, for example. The unit abundance is determined as follows: A broken-out section of a nanofiber sheet is prepared; and thus the area proportion of fibers in a region with a thickness equivalent to the fiber diameter in a stacking direction is calculated. The average abundance is the average of the unit abundances for the thickness of a certain region. In the description below, the abundance is the average abundance in a subject region unless otherwise stated, and is preferably 10% or more and 97% or less in the present invention. If the abundance is less than 10%, the nanofibers are present in a smaller amount to reduce the effect obtained by a high specific surface area, which is an advantage of nanofibers. If the abundance exceeds 97%, a slight amount of substances adhering to pores causes clogging of the pores.

In the polymer nanofiber sheet of the present invention, the number of polymer nanofibers, the distance between adjacent polymer nanofibers, and the stacking number of polymer nanofibers present in an arbitrary cross section can be appropriately set in accordance with characteristics of an intended polymer nanofiber sheet. For example, in the polymer nanofiber sheet 1 in FIGS. 1A and 1B, a plurality of polymer nanofibers 2 are accumulated in a random manner, and the polymer nanofibers 2 are crosslinked to each other at certain intersections or in the polymer nanofibers, thereby forming the polymer nanofiber sheet 1. These plurality of polymer nanofibers 2 adjacent to each other are crosslinked at at least some intersections through crosslinked parts formed between the polymer and the low molecular weight organic compound. Accordingly, a robust and flexible network is formed.

As a result, the polymer nanofiber sheet of the present invention has an advantage in long-term use because the sheet has high mechanical strength and detachment strength and the polymer nanofibers do not easily get lose.

Physical properties for evaluating the durability of a polymer nanofiber sheet include a tensile elastic modulus. The tensile elastic modulus is also called Young's modulus and is preferably 100 MPa or more. If having a tensile elastic modulus of less than 100 MPa, the sheet has low strength and cannot be used for a long period of time.

The polymer nanofiber sheet of the present invention is a sheet-shaped member formed by entangling polymer nanofibers with each other, and thus has a certain film thickness and also has pores with a certain size. The film thickness is preferably not less than 0.1 μm and less than 50 mm. The film thickness is more preferably more than 1 μm and less than 1 mm. This is because if the film thickness is less than 0.1 μm, nanofibers are insufficiently entangled and cannot form the structure of a nanofiber sheet. The average pore diameter is preferably 10 nm or more and 50 μm or less and more preferably not less than 10 nm and less than 20 μm. If the pores have an excessively small diameter of less than 10 nm, the advantageous effect of nanofibers due to high specific surface area will be reduced. Conversely, if the average pore diameter is more than 50 μm, an intended strength cannot be achieved in some cases. In consideration that the polymer nanofiber sheet of the present invention is used as a constituent material of a member such as filters, the polymer nanofiber sheet preferably has a certain strength or higher. Having a certain strength or higher means having a tensile elastic modulus of 100 MPa or more or being capable of withstanding a wind pressure test. The wind pressure test is, for example, a test performed by the following manner: To a nanofiber film attached to a thick paper, a wind of 50 Pa is applied for 2 minutes with an air gun that is disposed 3 cm apart from the film to observe whether the film is broken. In the present invention, a plurality of nanofiber sheets can be arranged to be used in order to improve the strength.

Polymer Nanofibers

Polymer nanofibers constituting the polymer nanofiber sheet of the present invention have at least one or more polymers, have a length greater than the thickness of the fiber, and contain a low molecular weight organic compound containing at least one 4- or higher-membered ring structure with an ether linkage during a spinning process. Here, the term "containing" is not limited to cases in which the low molecular weight organic compound is contained in the fiber and also includes cases in which the low molecular weight organic compound is present on the surface of the fiber.

In the present invention, the average diameter that indicates the thickness of polymer nanofibers is not limited to particular values but is preferably not less than 1 nm and less than 10,000 nm. In order to particularly produce a polymer nanofiber sheet having a high specific surface area, the average diameter is more preferably less than 5,000 nm. The average diameter is even more preferably less than 3,000 nm. If having an average diameter of less than 1 nm, the polymer nanofibers themselves are difficult to handle from the viewpoint of producing the polymer nanofiber sheet. Meanwhile, the polymer nanofibers having an average diameter of 50 nm or more are likely to be easy to handle and thus are preferred from the viewpoint of the ease of handling of the polymer nanofibers.

In the present invention, the polymer nanofiber can have any cross sectional shapes, and the specific shape is exemplified by a circular shape, an elliptical shape, a quadrangular shape, a polygonal shape, and a semicircular shape. The cross sectional shape of the polymer nanofiber does not have to be in the exact shape mentioned above, and can vary for a given cross section.

If a polymer nanofiber has a cylindrical shape, the diameter of the circle that is a cross section of the cylinder corresponds to the thickness of the polymer nanofiber. If a polymer nanofiber does not have a cylindrical shape, the thickness of the polymer nanofiber is the length of the longest straight line passing through the centroid of a cross section of the polymer nanofiber. In the present invention, the length of a polymer nanofiber is typically ten times or more greater than the thickness.

The shape of a polymer nanofiber (cross sectional shape of a fiber, diameter of a fiber, for example) can be determined by direct observation under a scanning electron microscope (SEM) or a laser microscope.

In the present invention, the polymer nanofiber is not limited to particular polymer nanofibers as long as the polymer nanofiber includes at least an organic polymer component. As the organic polymer (high molecular weight organic compound), conventionally known polymer materials can be used, and the materials can be used singly or in combination of two or more of them. Materials containing the organic polymer and further containing microparticles or conventionally known fillers can also be used, and these materials can be appropriately combined.

The polymer material to be the polymer nanofibers constituting the polymer nanofiber sheet of the present invention can be any materials capable of forming a fibrous structure. Specific examples of the polymer material include organic materials such as resin materials, inorganic materials such as silica, titania, and clay minerals, and hybrid materials of the organic material and the inorganic material.

Examples of the polymer material include fluorine-containing polymers (such as tetrafluoroethylene and polyvinylidene fluoride (PVDF); a copolymer with other monomers (for example, a copolymer of PVDF and hexafluoropropylene (PVDF-HFP)) can be included); polyolefinic polymers (such as polyethylene and polypropylene); polystyrene (PS); polyarylenes (aromatic polymers such as polyparaphenylene oxide, poly(2,6-dimethylphenylene oxide), and polyparaphenylene sulfide); polyimide; polyamide; polyamide imide; polybenzimidazole; modified polymers produced by introducing a sulfonic acid group ($-SO_3H$), a carboxyl group ($-COOH$), a phosphate group, a sulfonium group, an ammonium group, or a pyridinium group to a polyolefinic polymer, a polystyrene, a polyimide, or a polyarylene (aromatic polymer); modified polymers produced by introducing a sulfonic acid group, a carboxyl group, a phosphate group, a sulfonium group, an ammonium group, or a pyridinium group to the skeleton of a fluorine-containing polymer; polybutadiene compounds; polyurethane compounds (including elastomeric compounds and gel compounds); silicone compounds; polyvinyl chloride; polyethylene terephthalate; nylons; polyarylate and biodegradable polymers (such as polycaprolactone (PCL) and polylactic acid); polyethers (such as polyethylene oxide (PEG) and polybutylene oxide); and polyesters (PES) (such as polyethylene terephthalate (PET)).

These exemplified polymer materials can be used singly or in combination of two or more of them. To the polymer materials other than the polyolefinic polymers, the polystyrenes, the polyimides, the polyarylenes, or the fluorine-containing polymers, a sulfonic acid group, a carboxyl group, a phosphate group, a sulfonium group, an ammonium group, or a pyridinium group can be introduced, and the resulting modified polymers can be used. Copolymers obtained by copolymerization of plural types of monomers can also be used. In addition, when a polymer material that is difficult to melt, such as polyimide, polyamide, polyamide imide (PAI), or polybenzimidazole (PBI), is used, a thermoplastic resin can be used in combination, for example.

The inorganic material usable in combination with the organic polymer is exemplified by oxides of metal materials selected from Si, Mg, Al, Ti, Zr, V, Cr, Mn, Fe, Co, Ni, Cu, Sn, and Zn, and more specifically exemplified by metal oxides such as silica ($SiC_2$), titanium oxide, aluminum oxide, alumina sol, zirconium oxide, iron oxide, and chromium oxide. In addition, clay minerals such as montmorillonite (MN) can also be used. If containing the inorganic material, the polymer nanofibers are likely to greatly improve the mechanical strength when the polymer nanofibers are joined to each other, and thus such polymer nanofibers are preferred from the viewpoint of the improvement of durability.

Low Molecular Weight Organic Compound

In the present invention, the crosslinked part that crosslinks the polymers constituting the polymer nanofibers is formed from a crosslinking agent. The crosslinking agent used in the present invention is a low molecular weight organic compound containing at least one 4- or higher-membered ring structure with an ether linkage ($-O-$).

The compound inducing the formation of the crosslinked part 3 is a low molecular weight compound having at least one 4- or higher-membered ring structure with an ether linkage ($-O-$) in the ring and is preferably a low molecular weight compound having at least one 4- or higher- and 8- or lower-membered ring structure with an ether linkage. A low molecular weight organic compound having a 3-membered ring structure with an ether linkage ($-O-$) has a larger steric strain of the ring structure than those of compounds having a 4- or higher-membered ring structure and thus is unstable and highly nucleophilic. This feature can cause reactions other than intended chemical crosslinking during a production process of the polymer nanofiber sheet. Consequently, the polymer network structure constituting the nanofiber sheet can contain a component accelerating the reduction of the mechanical strength.

The low molecular weight organic compound used when the polymer nanofiber sheet 1 of the present invention is produced preferably has a molecular weight (number average molecular weight) of 100 to 3,000 from the viewpoint of uniform dispersion in polymer materials. A low molecular weight organic compound having a molecular weight (number average molecular weight) of less than 100 is highly volatile even when having a 4- or higher-membered ring structure with an ether linkage, and thus such a low molecular weight organic compound can volatilize during a preparation process of the nanofibers. If having a molecuweight (number average molecular weight) of more than 3,000, the low molecular weight organic compound is difficult to be uniformly compatible with polymer materials. Here, that a low molecular weight organic compound is not uniformly compatible with a polymer material means a phenomenon of causing cloudiness during a mixing step of the compound and the material, a phenomenon of causing phase separation during a sheet formation process, or the like. If a low molecular weight organic compound is not uniformly compatible in polymer nanofibers, chemical crosslinking formed by chemical reaction between the polymer and the low molecular weight organic compound is not sufficiently induced in the polymer nanofibers 2 and the crosslinked part 3 contained in the polymer nanofiber sheet 1.

The low molecular weight organic compound used for the formation of the crosslinked part 3 has at least one 4- or higher-membered ring structure with an ether linkage. Here, during the formation of the crosslinking portions 3a constituting the crosslinked part 3 formed between the polymer nanofibers 2 or during the crosslinking of a plurality of polymer chains contained in the polymer nanofiber 2, the ring structure functions as a crosslinkable functional group. In the present invention, the crosslinkable functional group is not limited to the ring structure. In other words, the low molecular weight organic compound used in the present invention can further have other crosslinkable functional groups such as a double bond in addition to the ring structure.

In the present invention, examples of the 4- or higher-membered ring structure with an ether linkage that is included in the low molecular weight organic compound and is a crosslinkable functional group include cyclic ethers such as oxetane, dihydrofuran, tetrahydrofuran, tetrahydropyran, and dioxane; heterocyclic compounds such as oxazine, benzoxazine, oxazole, and isoxazole; lactones such as β-lactone, γ-lactone, δ-lactone, and ε-lactone; acid anhydrides such as maleic anhydride and succinic anhydride; and lactide. The ring structure further includes halides, hydrogenated structures, and the like. The carbon atom (except the carbon atom constituting a carbonyl group) or the nitrogen atom contained in the ring structure can further have a single bond or a double bond. Among these ring structures, preferred is benzoxazine.

The low molecular weight organic compound used in the present invention can be a single kind or plural kinds thereof.

The low molecular weight organic compound used in the present invention is exemplified by the following compounds. In the present invention, the low molecular weight organic compound is not limited to these compounds.

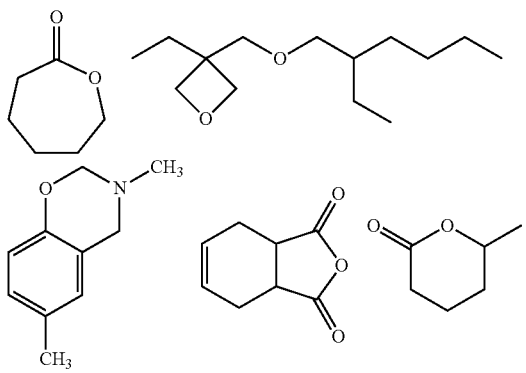

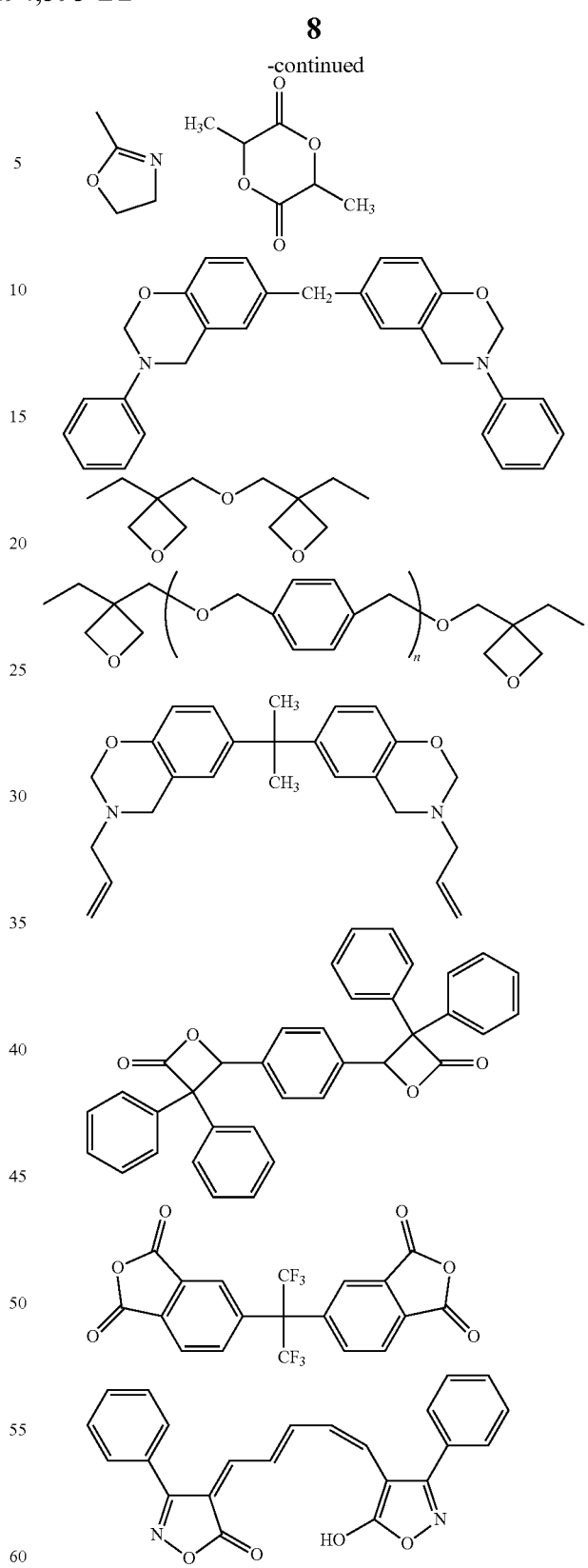

The low molecular weight organic compound used in the present invention is preferably an organic compound containing two 4- or higher-membered ring structures with an ether linkage. More preferred is an organic compound containing two benzoxazines as the 4- or higher-membered ring structure with an ether linkage. As the low molecular weight organic compound having two benzoxazines, F-a type benzoxazine and P-d type benzoxazine available from Shikoku Chemicals Corporation and bisphenol A benzoxazine, bisphenol F benzoxazine, phenolphthalein benzoxazine, thiodiphenol benzoxazine, and dicyclopentadiene benzoxazine available from Huntsman Specialty Chemicals can be used, for example.

In the present invention, the low molecular weight organic compound also includes oligomers (low molecular weight polymers). The molecular weight of the oligomer can be easily determined typically by GPC (gel permeation chromatography).

The low molecular weight organic compound used in the present invention is preferably a compound having good molecular symmetricity, namely, a compound of which the entire structure has line symmetry or point symmetry. If having good molecular symmetry, the compound can improve the crosslinking strength at the crosslinked part 3.

As for the low molecular weight organic compounds used in the present invention, the mechanism of forming the crosslinked part 3 having high strength by reaction between a compound having good molecular symmetry and a polymer is unclear, but the following hypothesis can be supposed. In other words, by the application of energy such as heat or light, the 4- or higher-membered ring structure with an ether linkage contained in the low molecular weight organic compound undergoes chemical reaction such as ring opening (ring cleavage) to chemically form the crosslinking portions 3a, thereby forming the crosslinked part 3. During the formation of the crosslinked part 3, a compound having good molecular symmetry forms the crosslinking portions 3a at an even number of positions due to the symmetry of the molecule itself. In the crosslinked part 3 formed by the formation of the crosslinking portions 3a, when the moiety that was the low molecular weight organic compound before the crosslinking is extracted for consideration, the formed crosslinked part 3 is to be line symmetrical or point symmetrical with respect to the center. When a stress is applied to such crosslinked parts 3, the stress is equally dispersed to the polymer constituting the polymer network through each crosslinked part 3. On this account, local stress concentration in polymer chains that are generated by chemical reaction between the polymer and the low molecular weight organic compound and constitute the polymer nanofiber 2 and the crosslinked part 3 can be suppressed. The above is the supposed hypothesis.

In the present invention, the functional group that the low molecular weight organic compound can have is preferably the same as or similar to at least some functional groups contained in the polymer. Here, "similar" means that functional groups compared have a common main skeleton. This structure allows the polymer or the low molecular weight organic compound to be dispersed more uniformly in the polymer nanofibers 2, and consequently the nanofibers or the polymer chains contained in the nanofibers are satisfactorily and easily joined to each other by crosslinking, thereby markedly improving the mechanical strength of the polymer nanofiber sheet.

Here, examples of the substituent contained in the repeating structures of the polymer constituting the polymer nanofiber sheet include an ether group, an aromatic ring group, a carbonyl group, an amido group, and an imido group. The repeating structure preferably contains an imido group because the rigid and robust molecular structure thereof is likely to achieve high mechanical strength in addition to heat resistance. This feature greatly improves the mechanical strength of the polymer nanofiber sheet and thus is preferred from the viewpoint of the improvement in durability.

In the polymer nanofiber sheet of the present invention, whether chemical crosslinking occurs during the formation of the sheet can be identified by infrared spectroscopy (IR) or Raman spectroscopy, for example. In a specific identification technique, an IR spectrum of a polymer or a low molecular weight organic compound at a time point before chemical crosslinking is measured. After the chemical crosslinking, an IR spectrum of the sample is measured again. The occurrence of crosslinking can be identified by whether both appearance of a peak derived from the crosslinking and reduction of a peak observed before the crosslinking can be observed.

In the present invention, the low molecular weight organic compound having a 4- or higher-membered ring structure with an ether linkage is preferably contained in an amount of 60% by weight or less with respect to the total weight of a polymer, which is the base material, and the low molecular weight organic compound.

If the low molecular weight organic compound is contained in an amount of more than 60% by weight, the proportion of the crosslinked part 3 formed by ring-opening polymerization between the low molecular weight organic compounds increases in the polymer network. As a result, in the polymer network constituting the polymer nanofiber sheet, the proportion of products generated by the self-reaction of the low molecular weight organic compound increases, and consequently the polymer network itself becomes brittle in some cases. This structure can deteriorate the impact resistance of the nanofiber sheet.

Average Solubility Parameter

An average solubility parameter will next be described as an important factor in the polymer nanofiber sheet of the present invention. In the present invention, the difference between the average solubility parameter of the polymer and the average solubility parameter of the low molecular weight organic compound is less than 8 $(J/cm^3)^{1/2}$. The difference is preferably less than 7.5 $(J/cm^3)^{1/2}$. In the present invention, the difference between the average solubility parameter of the polymer and the average solubility parameter of the low molecular weight organic compound is preferably more than 1 $(J/cm^3)^{1/2}$.

The solubility parameter used in the present invention is the Hansen solubility parameter. The Hansen parameter is composed of the dispersion force of atoms, the force generated between permanent dipoles of molecules, and the hydrogen bond energy of molecules, which are represented by $\delta_D$, $\delta_P$, and $\delta_H$ $[(J/cm^3)^{1/2}]$, respectively. Here, the solubility parameter $\delta[(J/cm^3)^{1/2}]$ of a substance is represented by the following expression:

$$\delta=(\delta_D^2+\delta_P^2+\delta_H^2)^{1/2} \ [(J/cm^3)^{1/2}].$$

The Hansen parameters for common substances are available from literature data as measured values, and those for special substances can be calculated by a calculation software even if unavailable from literature data.

When a plurality of (for example, two) substances having greatly different Hansen parameters are mixed, larger energy is required for dissolving or mixing them. On this account, if the difference in Hansen parameter is large, the solubility of a solute for a solvent becomes small to interfere with the mixing with each other. Here, the difference in Hansen parameter between a substance a and a substance b, $|\delta_{(a-b)}|$ [(J/cm³)$^{1/2}$], is calculated in accordance with the following expression:

$$|\Delta\delta_{(a-b)}|=\{4(\delta_{aD}-\delta_{bD})^2+(\delta_{aP}-\delta_{bP})^2+(\delta_{aH}-\delta_{bH})^2\}^{1/2}.$$

The difference between the Hansen parameter of the polymer constituting the polymer nanofiber sheet of the present invention and the Hansen parameter of the low molecular weight organic compound is less than 8 (J/cm³)$^{1/2}$. Here, if the difference between both the Hansen parameters is 8 (J/cm³)$^{1/2}$ or more, the phase separation of the polymer and the low molecular weight organic compound readily progresses during the production process of the polymer nanofiber sheet of the present invention, and the crosslinking in the nanofibers or between the nanofibers is difficult to form. Accordingly, the nanofiber sheet having high detachment strength and mechanical strength cannot be obtained.

Latent Catalyst

In the present invention, in order to effectively perform crosslinking (mainly chemical crosslinking) by the low molecular weight organic compound having a 4- or higher-membered ring structure with an ether linkage, a conventionally known latent catalyst can be added and used. Here, the latent catalyst is a catalyst that generates reactive species (cations, anions, radicals) accelerating crosslinking by the ring structure with a particular stimulus such as heat, and is exemplified by acid generators.

When the latent catalyst is used to produce the polymer nanofiber sheet of the present invention, the latent catalyst is preferably a thermal cationic polymerization initiator, which generates cations by heat. The thermal cationic polymerization initiator is inert at normal temperature, but when heated to reach the critical temperature (reaction starting temperature), the thermal cationic polymerization initiator cleaves to generate a cation. The cation helps the low molecular weight organic compound undergo the crosslinking. Examples of such a catalytic compound include organic metal complexes such as aluminum chelate complexes, iron-arene complexes, titanocene complexes, and aryisilanol-aluminum complexes; quaternary ammonium salt compounds, phosphonium salt compounds, iodonium salt compounds, and sulfonium salt compounds having negative ion components such as a hexafluoroantimonate ion (SbF$_6^-$), a tetrafluoroantimonate ion (SbF$_4^-$), a hexafluoroarsenate ion (AsF$_6^-$), and a hexafluorophosphate ion (PF$_6^-$).

When the thermal cationic polymerization initiator is used to produce the polymer nanofiber sheet, the catalyst preferably works at a temperature equal to or lower than the decomposition temperature of a polymer material to be used.

Method for Producing Polymer Nanofiber Sheet

A method for producing the polymer nanofiber sheet of the present invention will be specifically described next. The method for producing the polymer nanofiber sheet of the present invention includes the following steps (A) to (C):
(A) a mixing step of mixing a polymer and a low molecular weight organic compound.
(B) a spinning step of spinning polymer nanofibers including the polymer.
(C) a crosslinking step of the polymer nanofibers.

The step (A) is also a step of preparing a polymer solution used for spinning polymer nanofibers. Through the step (B), polymer nanofibers are entangled with each other to form a sheet-shaped substance, but a crosslinked polymer nanofiber sheet is produced in the subsequent step (C). The sheet forming step is thus a combination of the steps (B) and (C) in the present invention.

(A) Mixing Step

When a polymer is mixed with a low molecular weight organic compound, a solvent capable of dissolving the polymer and the low molecular weight organic compound is typically used. The solvent used in the step can be any solvents capable of dissolving the polymer. In the present invention, materials having similar solubility parameters (the difference in solubility parameter between the polymer and the low molecular weight organic compound is less than 8 (J/cm³)$^{1/2}$) are used, and thus it is not necessary to prepare a solvent for dissolving the low molecular weight organic compound separately from the solvent for dissolving the polymer. In this step, a single solvent can be used, or a mixture of two or more solvents can be used at an appropriate ratio. When a solution polymer is used as the polymer, it is not necessary to separately prepare the solvent.

(B) Spinning Step

When the polymer nanofiber sheet of the present invention is produced, it is necessary to form polymer nanofibers constituting the sheet. Here, the method of forming the polymer nanofibers is not limited to particular methods, and is exemplified by electrospinning (electric field spinning and electrostatic spinning) and meltblowing. In the present invention, of these methods, a single method can be selected, or two or more methods can be selected and combined. Among the above methods, the electrospinning is a method in which polymer nanofibers are formed while a high voltage (for example, about 20 kV) is applied across a syringe filled with a polymer solution and a collector electrode. When this method is adopted, the solution extruded from the syringe is charged and dispersed in an electric field, and the solvent contained in the dispersed solution evaporate with time, consequently yielding the solute in a thin line shape. The solute in a thin line shape becomes polymer fibers, which adhere to the collector such as a substrate.

Among the production methods listed above, polymer nanofibers are preferably produced by spinning through the electrospinning, which has the following characteristics (i) to (iii):
(i) capable of spinning various polymers into fiber shapes.
(ii) capable of comparatively simply controlling a fiber shape and of easily producing fibers having a thickness of several tens of micrometers to several nanometers.
(iii) a simple production process.

Figure 2:
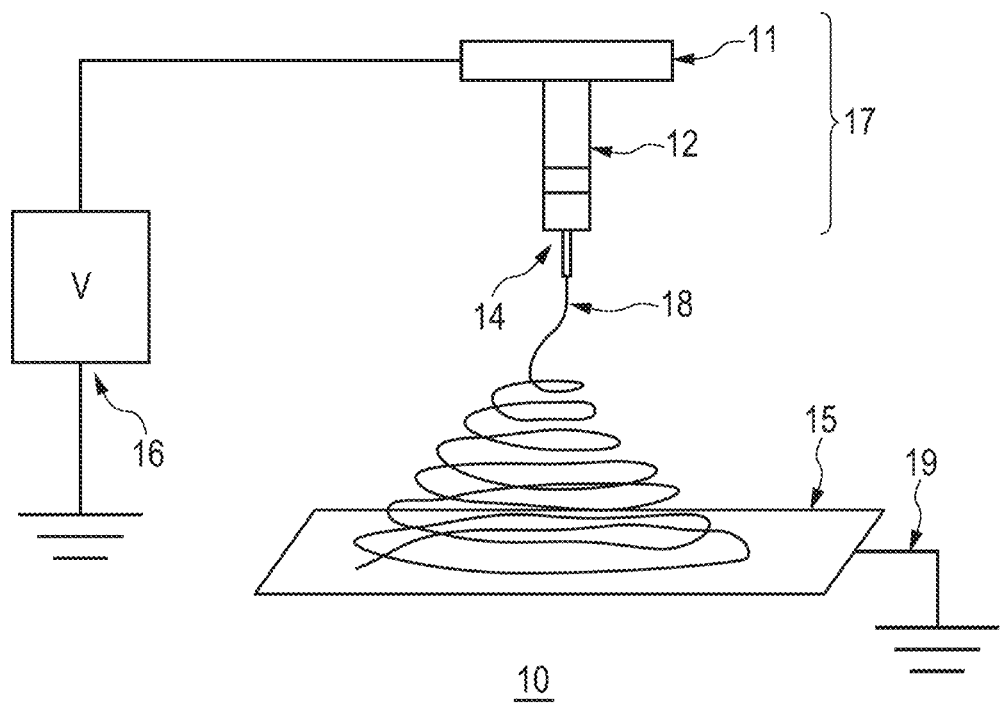
FIG. 2 is a schematic view illustrating an example of a production apparatus for the polymer nanofiber sheet of the present invention.

Here, the method for producing the polymer nanofiber sheet by spinning polymer nanofibers through the electrospinning will be described with reference to drawings. FIG. 2 is a schematic view illustrating an example of a production apparatus for the polymer nanofiber sheet of the present invention.

A production apparatus 10 illustrated in FIG. 2 specifically adopts a method of extruding a polymer solution stored in a storage tank 12 from a spinning nozzle 14. The polymer solution extruded from the spinning nozzle is scattered in various directions and thus the spun polymer nanofibers are three dimensionally entangled to naturally yield a polymer nanofiber sheet. On this account, it is not necessary to twist the spun polymer nanofibers in a later step.

Component members of the production apparatus 10 in FIG. 2 will next be described. The storage tank 12 for storing the polymer solution is disposed through a connector 11. The connector 11 is electrically connected to a high-voltage power supply 16 through a wiring. Each of the connector 11 and the storage tank 12 is a component member of a head 17. A collector 15 on which the spun polymer nanofibers are collected is disposed so as to face the head 17 with a certain space therebetween. The collector 15 is grounded through a wiring 19.

The polymer solution is extruded from the tank 12 to the spinning nozzle 14 at a constant speed. To the spinning nozzle, a voltage of 1 kV to 50 kV is applied, and when electrical attraction exceeds the surface tension of the polymer solution, a jet 18 of the polymer solution is ejected toward the collector 15. At this time, the solvent in the jet gradually volatilizes, and when the jet reaches the collector 15, the corresponding polymer nanofibers are obtained. Here, a polymer solution designed to have conditions for yielding nanofibers is introduced into the tank 12 to conduct spinning.

What is stored in the tank 12 for spinning is not limited to the polymer solution, and a molten polymer heated at a temperature equal to or higher than the melting point can be used.

(C) Crosslinking Step

In the present invention, the crosslinking of polymer nanofibers refers to not only the following state (i) but also the state (ii), and the following states (i) and (ii) can occur concurrently.

(i) A state in which adjacent polymer nanofibers are chemically crosslinked and fixed to each other (ii) A state in which polymer chains contained in polymer nanofibers are chemically crosslinked and fixed to each other In the present invention, crosslinking means that new bonds are formed between a polymer and a low molecular weight organic compound by chemical reaction and a network structure is accordingly formed. Here, the chemical reaction means that one of the phenomena listed below occur, for example.

(C1) Chemical reaction between the low molecular weight organic compound and a nucleophilic substituent contained in the polymer (C2) Ring-opening polymerization reaction caused between the low molecular weight organic compounds and derived from the ring structure (C3) Complex reaction in which the reactions (C1) and (C2) progress Here, the "nucleophilic substituent" of the polymer inducing the chemical reaction (C1) is exemplified by substituents having an active hydrogen, such as a hydroxy group, a carboxy group, an amino group, and a thiol group. In a situation in which the Friedel-Crafts reaction can be applied, aromatic rings such as a benzene ring can also be included in the nucleophilic substituent. The reactions (C1) and (C2) can be performed independently or concurrently.

In the present invention, as the method of crosslinking polymer nanofibers, energy inducing the crosslinking is applied to the polymer nanofiber sheet obtained by spinning. The method of applying energy is exemplified by thermal application, ultraviolet irradiation, electron beam irradiation, ultrasonic application, and electromagnetic wave application. The method by thermal application is preferred due to uniformity or simplicity.

A specific technique for the heat treatment of polymer nanofibers required for inducing the crosslinking will next be described. Here, the specific method for the heat treatment is not limited to particular methods. For example, heater heating, warm air heating, infrared heating, microwave heating, or ultrasonic wave heating can be used. An appropriate method can be selected depending on using conditions, for example.

Specifically, preferably used is a method of hot-pressing a polymer nanofiber sheet, a method of heat treatment with, for example, an industrial dryer or an oven, or a method of heating a polymer nanofiber sheet with a heater once and then further heating the sheet in an oven, for example. Among them, the method of heat treatment with an oven is particularly preferably used because the temperature of the entire material can be easily uniformized without unevenness.

When performing the heat treatment, it is performed under temperature conditions where polymer nanofibers are not melted. The temperature can be any temperatures lower than the decomposition temperature of the polymer material constituting polymer nanofibers, and can be appropriately selected depending on, for example, physical properties of a polymer material to be used or of an intended polymer nanofiber sheet. For example, the heating temperature is preferably 30° C. to 150° C. The temperature for heat treatment is preferably lower than the glass transition point (Tg) of polymer nanofibers because the shape of the polymer nanofibers can be readily maintained.

In the present invention, the difference between the average solubility parameter of the polymer and the average solubility parameter of the low molecular weight organic compound is required to be less than 8 $(J/cm^3)^{1/2}$. This means that the difference in average solubility parameter between the polymer nanofibers extracted from a polymer nanofiber sheet and the low molecular weight organic compound is less than 8 $(J/cm^3)^{1/2}$. When the difference in average solubility parameter between both the materials is less than 8 $(J/cm^3)^{1/2}$ as described above, the low molecular weight organic compound can be allowed to adhere to the inside or the surface of the formed polymer nanofibers during the formation of the polymer nanofibers in the spinning step. Here, the low molecular weight organic compound attached to the surface of the polymer nanofibers is to be interposed between the polymer nanofibers in at least a part of the area where the polymer nanofibers are in contact with each other when the polymer nanofibers are entangled with each other during the progress of the spinning step. When the crosslinking step is performed in this condition, the polymer contained in the polymer nanofibers is chemically reacted with the low molecular weight organic compound interposed between the polymer nanofibers, and thus the polymer nanofibers are crosslinked with each other. The crosslinking increases the strength of the polymer nanofiber sheet of the present invention. Meanwhile, the low molecular weight organic compound contained in the polymer nanofibers is to be reacted with the low molecular weight organic compound itself and with polymer chains constituting the polymer nanofibers in the crosslinking step. As a result, mutual crosslinking of the polymer chains through the low molecular weight organic compound and entanglement between the mutual reaction products of the low molecular weight organic compounds and the crosslinked polymer chains are generated to increase the strength of the polymer nanofiber itself. As the strength of the polymer nanofiber itself increases in this manner, the strength of the polymer nanofiber sheet increases proportionately. The structure of the low molecular weight organic compound that fails to undergo the ring-opening (unreacted low molecular weight organic compound) can be identified by TOF-SIMS, LC-MS, and thermal decomposition GC-MS.

EXAMPLES

The present invention will be described in detail with reference to examples hereinafter. However, the present invention is not limited to the examples described below. The present invention also includes those obtained by appropriately changing or modifying the examples described below without departing from the scope of the present invention.

Measurement Method and Evaluation Method

Measurement methods and evaluation methods of physical properties of polymer nanofiber sheets produced in the examples and the comparative examples described below will be described.

(1) Average Fiber Diameter of Polymer Nanofibers

A polymer nanofiber sheet was observed with a scanning electron microscope (SEM) and the thus-obtained image was captured and processed by the image analysis software "Image J" to give an image. Next, 50 points on the projected image of polymer nanofibers were randomly selected. The widths of polymer nanofibers at the respective points were measured, and thus the average fiber diameter of the polymer nanofibers was calculated.

(2) Evaluation of Detachment Strength and Mechanical Strength of Polymer Nanofiber Sheet The detachment strength and the mechanical strength of a polymer nanofiber sheet was determined and evaluated by the methods described below.

The detachment strength and the mechanical strength of a polymer nanofiber sheet were evaluated by determining the tensile elastic modulus of the polymer nanofiber sheet. Specifically, the tensile elastic modulus of a polymer nanofiber sheet was determined by tensile property measurement with a micro autograph (Shimadzu Corporation: MST-I MICRO STRAIN TESTER).

A higher rate of increase in tensile elastic modulus means a higher degree of crosslinking between polymer nanofibers in a polymer nanofiber sheet. Simultaneously, it is apparent that the detachment strength increases as the degree of crosslinking between polymer nanofibers improves. In other words, a higher rate of increase in tensile elastic modulus indicates an improvement in detachment strength and mechanical strength of a polymer nanofiber sheet. A polymer nanofiber sheet having a high rate of increase in tensile elastic modulus can therefore be used over a long period of time.

(3) Average Solubility Parameter

As the average solubility parameter, the Hansen solubility parameter was used. As for polymers, "Hansen Solubility Parameters: A User's Handbook, Second Edition (written by Charles M. Hansen, CRC Press)" was used for literature data. As for low molecular weight organic compounds, calculated values were obtained with the calculation software, "Hansen Solubility Parameter in Practice (HSPiP, manufactured by Charles M. Hansen)" by inputting the molecular structures. The respective values were used to calculate the difference in average solubility parameter.

(4) IR Measurement of Polymer Nanofiber Sheet

A polymer nanofiber sheet was subjected to IR measurement to examine whether a change of peaks derived from the low molecular weight organic compound contained in the polymer nanofiber sheet was observed before and after energy application (heat treatment). In addition, whether the polymer nanofibers constituting a polymer nanofiber sheet underwent crosslinking reaction (chemical crosslinking) was examined by the IR measurement. Here, whether an increase of a peak (around 1,100 $cm^{-1}$ to 1,200 $cm^{-1}$) derived from an ether linkage (—O—) formed by the reaction of a polymer and a low molecular weight organic compound was also examined. In other words, whether a low molecular weight organic compound is reacted in a heat treatment step can be examined by the IR measurement. Whether a similar peak pattern was obtained was also examined by IR measurement at 10 random points of a polymer nanofiber sheet. This measurement enables an examination as to whether the low molecular weight organic compound is uniformly dispersed in the polymer nanofiber sheet. As a result of the measurement, a polymer nanofiber sheet satisfying both the chemical crosslinking and the uniform dispersiveness was evaluated as good, and a sheet failing to satisfy either one of them was evaluated as improper.

Example 1

(1) Preparation of Polymer Solution

A polyamide imide (PAI) solution (manufactured by Hitachi Chemical Co., Ltd.: HPC-5020) as a polymer material was mixed with an F-a type benzoxazine (manufactured by Shikoku Chemicals Corporation) as a low molecular weight organic compound. At this time, the mixing ratio of the PAI and the F-a type benzoxazine was 3:1 in terms of weight ratio (mixing proportion of F-a type benzoxazine: 25% by weight). Next, SI-100L (manufactured by Sanshin Chemical Industry Co., Ltd.), which is an aromatic sulfonium salt latent catalyst, was mixed at a proportion of 2% by weight with respect to the F-a type benzoxazine. A polymer solution was thus prepared.

(2) Spinning Step

The polymer solution prepared in (1) was ejected by electrospinning to be spun. Thus, a polymer nanofiber sheet in which polymer nanofibers composed of the PAI, the F-a type benzoxazine, and unvolatilized solvents were physically entangled was produced. In this step, specifically, a head part 17 constituting an electrospinning apparatus (manufactured by NEC Company Ltd.) in FIG. 2 was first assembled in the following sequence of (2-1) and (2-2):

(2-1) mounting a head 11 (clip spinneret) for spinning a prepared polymer solution.

(2-2) mounting a tank 12 filled with the polymer solution prepared in (1) on the head 11.

Next, to the spinning nozzle 14, a voltage of 21.5 kV was applied to eject the polymer solution filled in the tank 12 toward a collector 15 for 25 minutes, yielding polymer nanofibers. The polymer nanofibers obtained in this manner were used in the subsequent step.

(3) Crosslinking Step

The polymer nanofibers obtained in an accumulated form in (2) were released from the collector 15, then placed on a polytetrafluoroethylene sheet attached to a glass plate, and subjected to heat treatment in an oven at 130° C. for 2 hours. This operation yielded a polymer nanofiber sheet having crosslinked parts formed by chemical reaction of the polymer nanofibers and the low molecular weight organic compound.

(4) Evaluation of Polymer Nanofiber Sheet

Figure 3:
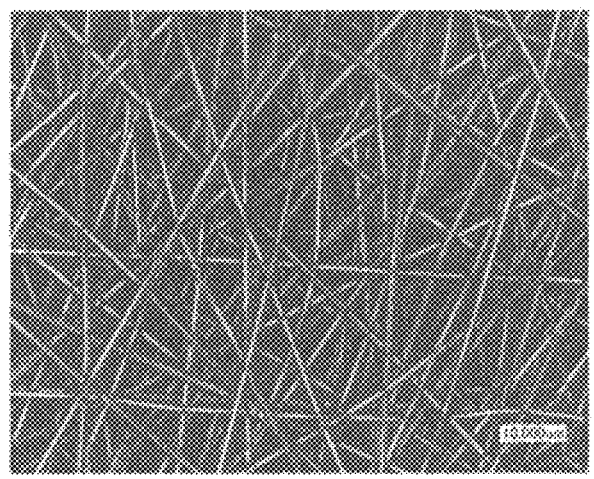
FIG. 3 is a laser microphotograph of a polymer nanofiber sheet produced in Example 1.

Physical properties of the obtained polymer nanofiber sheet were determined and evaluated. Table 1 shows the results. FIG. 3 is a laser microphotograph of the surface of the polymer nanofiber sheet produced in the example. As shown in FIG. 3, the polymer nanofiber sheet obtained in this example was identified as a sheet in which the polymer nanofibers were accumulated. The polymer nanofibers constituting the sheet had an average fiber diameter of 0.5 μm.

Example 2

(1) Preparation of Polymer Solution

A polyimide imide (PAI) solution (manufactured by Hitachi Chemical Co., Ltd.: HPC-5020) as a polymer material was mixed with a P-d type benzoxazine (manufactured by Shikoku Chemicals Corporation) as a low molecular weight organic compound. At this time, the mixing ratio of the PAI and the P-d type benzoxazine was 3:1 in terms of weight ratio (mixing proportion of P-d type benzoxazine: 25% by weight). Next, SI-100L (manufactured by Sanshin Chemical Industry Co., Ltd.), which is an aromatic sulfonium salt latent catalyst, was mixed at a proportion of 2% by weight with respect to the P-d type benzoxazine.

(2) Spinning Step

Polymer nanofibers were obtained in the same manner as in (2) of Example 1.

(3) Heat Treatment Step

A polymer nanofiber sheet was obtained in the same manner as in (3) of Example 1.

(4) Evaluation of Polymer Nanofiber Sheet

The obtained polymer nanofiber sheet was subjected to the measurement and the evaluation in the same manner as in Example 1. Table 1 shows the results. The polymer nanofibers constituting the sheet had an average fiber diameter of 0.5 µm.

Example 3

(1) Preparation of Polymer Solution

Polyamide 66 (manufactured by Toray Industries Inc.: CM3301L, PA66) as a polymer material was dissolved in N,N'-dimethylacetamide (DMA, manufactured by Kishida Chemical Co., Ltd.) to prepare a DMA solution containing 30% by weight of PA66 in terms of weight ratio. Next, the thus-prepared DMA solution was mixed with an F-a type benzoxazine (manufactured by Shikoku Chemicals Corporation) as a low molecular weight organic compound. At this time, the mixing ratio of the PA66 and the F-a type benzoxazine was 3:1 in terms of weight ratio (mixing proportion of F-a type benzoxazine: 25% by weight). Next, SI-100L (manufactured by Sanshin Chemical Industry Co., Ltd.), which an aromatic sulfonium salt latent catalyst, was mixed at a proportion of 2% by weight with respect to the F-a type benzoxazine.

(2) Spinning Step

Polymer nanofibers were spun in the same manner as in (2) of Example 1 except that the voltage applied to the spinning nozzle 14 in (2) of Example 1 was changed as shown in Table 1.

(3) Crosslinking Step

A polymer nanofiber sheet was obtained by heat treatment in the same manner as in (3) of Example 1.

(4) Evaluation of Polymer Nanofiber Sheet

The obtained polymer nanofiber sheet was subjected to the measurement and the evaluation in the same manner as in Example 1. Table 1 shows the results. The polymer nanofibers constituting the sheet had an average fiber diameter of 0.7 µm.

Example 4

(1) Preparation of Polymer Solution

Polyamide 66 (manufactured by Toray Industries Inc.: CM3301L, PA66) as a polymer material was mixed with N,N'-dimethylacetamide (DMA, manufactured by Kishida Chemical Co., Ltd.) to prepare a DMA solution containing 30% by weight of PA66 in terms of weight ratio. Next, the DMA solution was mixed with a P-d type benzoxazine (manufactured by Shikoku Chemicals Corporation) as a low molecular weight organic compound. At this time, the mixing ratio of the PA66 and the P-d type benzoxazine was 3:1 in terms of weight ratio (mixing proportion of P-d type benzoxazine: 25% by weight). Next, SI-100L (manufactured by Sanshin Chemical Industry Co., Ltd.), which is an aromatic sulfonium salt latent catalyst, was mixed at a proportion of 2% by weight with respect to the P-d type benzoxazine.

(2) Spinning Step

Polymer nanofibers were obtained in the same manner as in (2) of Example 1 except that the voltage applied to the spinning nozzle 14 in (2) of Example 1 was changed as shown in Table 1.

(3) Crosslinking Step

A polymer nanofiber sheet was obtained in the same manner as in (3) of Example 1.

(4) Evaluation of Polymer Nanofiber Sheet

The obtained polymer nanofiber sheet was subjected to the measurement and the evaluation in the same manner as in Example 1. Table 1 shows the results. The polymer nanofibers constituting the sheet had an average fiber diameter of 0.7 µm.

Example 5

(1) Preparation of Polymer Solution

Polymethyl methacrylate (manufactured by Sumitomo Chemical Co., Ltd.: Sumipex MM, PMMA) as a polymer material was mixed with N,N'-dimethylacetamide (DMA, manufactured by Kishida Chemical Co., Ltd.) to prepare a DMA solution containing 30% by weight of PMMA in terms of weight ratio. Next, the DMA solution was mixed with a F-a type benzoxazine (manufactured by Shikoku Chemicals Corporation) as a low molecular weight organic compound. At this time, the mixing ratio of the PMMA and the F-a type benzoxazine was 3:1 in terms of weight ratio (the mixing ratio of F-a benzoxazine: 25% by weight). Next, SI-100L (manufactured by Sanshin Chemical Industry Co., Ltd.), which an aromatic sulfonium salt latent catalyst, was mixed at a proportion of 2% by weight with respect to the F-a type benzoxazine.

(2) Spinning Step

Polymer nanofibers were obtained in the same manner as in (2) of Example except that the voltage applied to the spinning nozzle 14 in (2) of Example 1 was changed as shown in Table 1.

(3) Crosslinking Step

The polymer nanofibers obtained were released from the collector 15, then placed on a polytetrafluoroethylene sheet attached to a glass plate, and subjected to heat treatment in an oven at 120° C. for 2 hours. This operation yielded a polymer nanofiber sheet.

(4) Evaluation of Polymer Nanofiber Sheet

The obtained polymer nanofiber sheet was subjected to the measurement and the evaluation in the same manner as in Example 1. Table 1 shows the results. The polymer nanofibers constituting the sheet had an average fiber diameter of 0.5 µm.

Example 6

(1) Preparation of Polymer Solution

Polyethylene terephthalate (manufactured by Kuraray Co., Ltd.: Kurapet, PET) as a polymer material was mixed with 1,1,1,3,3,3-hexafluoro-2-propanol (HFIP, manufactured by Tokyo Chemical Industry Co., Ltd.) to prepare a HFIP solution containing 10% by weight of PET in terms of weight ratio. Next, the HFIP solution was mixed with an F-a benzoxazine type (manufactured by Shikoku Chemicals Corporation) as a low molecular weight organic compound. At this time, the mixing ratio of the PET and the F-a type benzoxazine was 3:1 in terms of weight ratio (mixing proportion of F-a type benzoxazine: 25% by weight). Next, SI-100L (manufactured by Sanshin Chemical Industry Co., Ltd.), which is an aromatic sulfonium salt latent catalyst, was mixed at a proportion of 2% by weight with respect to the F-a type benzoxazine.

(2) Spinning Step

Polymer nanofibers were obtained in the same manner as in (2) of Example 1 except that the voltage applied to the spinning nozzle 14 in (2) of Example 1 was changed as shown in Table 1.

(3) Crosslinking Step

A polymer nanofiber sheet was obtained in the same manner as in (3) of Example 1.

(4) Evaluation of Polymer Nanofiber Sheet

The obtained polymer nanofiber sheet was subjected to the measurement and the evaluation in the same manner as in Example 1. Table 1 shows the results. The polymer nanofibers constituting the obtained polymer nanofiber sheet had an average fiber diameter of 0.6 μm.

Comparative Example 1

(1) Preparation of Polymer Solution

As the polymer solution, a polyamide imide (PAI) solution (manufactured by Hitachi Chemical Co., Ltd.: HPC-5020) was used. In this comparative example, the F-a type benzoxazine, which was used in Example 1, was not added to the polymer solution.

(2) Spinning Step

Polymer nanofibers were obtained in the same manner as in (2) of Example 1 except that the voltage applied to the spinning nozzle 14 in (2) of Example 1 was changed as shown in Table 1.

(3) Crosslinking Step

The polymer nanofibers obtained were released from the collector, then placed on a polytetrafluoroethylene sheet attached to a glass plate, and subjected to heat treatment in an oven at 130° C. for 2 hours, giving a polymer nanofiber sheet.

(4) Evaluation of Polymer Nanofiber Sheet

The obtained polymer nanofiber sheet was subjected to the measurement and the evaluation in the same manner as in Example 1. Table 1 shows the results. The polymer nanofibers constituting the obtained polymer nanofiber sheet had an average fiber diameter of 0.6 μm.

Comparative Example 2

(1) Preparation of Polymer Solution

A polyamide imide (PAI) solution (manufactured by Hitachi Chemical Co., Ltd.: HPC-5020) as a polymer material was mixed with 3,1-benzoxazine-2,4(1H)-dione (manufactured by Wako Pure Chemical Industries, Ltd.) as a low molecular weight organic compound. At this time, the mixing ratio of the PAI and the 3,1-benzoxazine-2,4(1H)-dione was 3:1 in terms of weight ratio (mixing proportion of 3,1-benzoxazine-2,4(1H)-dione: 25% by weight). The low molecular weight organic compound used in this comparative example was a compound having poor molecular symmetry, and the difference in solubility parameter between the polymer material and the low molecular weight organic compound was larger than 7. Next, SI-100L (manufactured by Sanshin Chemical Industry Co., Ltd.), which is an aromatic sulfonium salt latent catalyst, was mixed at a proportion of 2% by weight with respect to the 3,1-benzoxazine-2,4(1H)-dione.

(2) Spinning Step

Polymer nanofibers were obtained in the same manner as in (2) of Example 1 except that the voltage applied to the spinning nozzle 14 in (2) of Example 1 was changed as shown in Table 1.

(3) Crosslinking Step

When subjected to the heat treatment in the same conditions as in (3) of Example 1. As a consequence, the polymer nanofibers prepared in (2) melted and failed to maintain a fiber shape. On this account, physical properties of a polymer nanofiber sheet were not evaluated in this comparative example (see Table 1).

Comparative Example 3

(1) Preparation of Polymer Solution

Cellulose acetate (manufactured by Daicel: L-70) as a polymer material was dissolved in a mixed solvent of N,N'-dimethylacetamide (DMA, manufactured by Kishida Chemical Co., Ltd.) and acetone (manufactured by Kishida Chemical Co., Ltd.). At this time, the solvent weight ratio of the DMA and the acetone was 1:2 in the mixed solvent, and the content of the cellulose acetate in the solution was 15% by weight with respect to the total solution. Next, an F-a type benzoxazine (manufactured by Shikoku Chemicals Corporation) as a low molecular weight organic compound was added and mixed. At this time, the mixing ratio of the cellulose acetate and the F-a type benzoxazine was 3:1 in terms of weight ratio (mixing proportion of F-a benzoxazine: 25% by weight). The difference in solubility parameter between the polymer material used in this comparative example and the F-a type benzoxazine was 7 $(J/cm^3)^{1/2}$ or more as shown in Table 1. Next, SI-100L (manufactured by Sanshin Chemical Industry Co., Ltd.), which is an aromatic sulfonium salt latent catalyst, was mixed at a proportion of 2% by weight with respect to the P-d type benzoxazine.

(2) Spinning Step

Polymer nanofibers were obtained in the same manner as in (2) of Example 1 except that the voltage applied to the spinning nozzle 14 in (2) of Example 1 was changed as shown in Table 1.

(3) Crosslinking Step

When subjected to the heat treatment in the same conditions as in (3) of Example 1. As a consequence, the polymer nanofibers prepared in (2) melted and failed to maintain a fiber shape. On this account, physical properties of a polymer nanofiber sheet were not evaluated in this comparative example (see Table 1).

TABLE 1

| | Polymer (A) | Low molecular weight compound (B) | Difference in solubility parameter | Relative amount of B | Applied voltage | Nanofiber diameter | Young's modulus (tensile elastic modulus) | Identification of crosslinking by IR |
|---|---|---|---|---|---|---|---|---|
| Example 1 | PAI | F-a type benzoxazine | 6.83 | 25 wt % | 21.5 kV | 500 nm | 480 MPa | Good |
| Example 2 | PAI | P-d type benzoxazine | 6.11 | 25 wt % | 21.5 kV | 500 nm | 400 MPa | Good |
| Example 3 | PA66 | F-a type benzoxazine | 6.59 | 25 wt % | 20.0 kV | 700 nm | 355 MPa | Good |
| Example 4 | PA66 | P-d type benzoxazine | 6.78 | 25 wt % | 20.0 kV | 700 nm | 337 MPa | Good |
| Example 5 | PMMA | F-a type benzoxazine | 7.06 | 25 wt % | 19.5 kV | 500 nm | 223 MPa | Good |
| Example 6 | PET | F-a type benzoxazine | 5.79 | 25 wt % | 19.0 kV | 600 nm | 215 MPa | Good |
| Comparative Example 1 | PAI | — | — | — | 21.0 kV | 600 m | 25 MPa | — |
| Comparative Example 2 | PAI | 3,1-benzoxazine-2,4(1H)-dione | 15.2 | 25 wt % | 20.5 kV | N.A. (melted) | N.A. | Improper (melted) |
| Comparative Example 3 | Cellulose acetate | F-a benzoxazine | 12.8 | 25 wt % | 19.5 kV | N.A. (melted) | N.A. | Improper (melted) |

The results revealed or identified in Examples and Comparative Examples will be described below.

Comparison between Examples (Examples 1 to 4) and Comparative Example 1 demonstrates that the tensile elastic modulus was greatly improved when the polymer nanofiber sheets were produced by spinning and heat-treating the solutions containing a polymer and a low molecular weight organic compound having a 4- or higher-membered ring structure with an ether linkage. The photograph of the polymer nanofiber sheet in Comparative Example 1 indicates that the nanofiber shape was partly maintained even after the heat treatment. These results suggest that in Comparative Example 1, the structure in which polymer nanofibers were partly melted and joined to each other was formed by the heat treatment, but no low molecular weight organic compound having a 4- or higher-membered ring structure with an ether linkage was contained, accordingly chemical crosslinking between the nanofibers insufficiently progressed, resulting in the low tensile elastic modulus and the low detachment strength.

In Comparative Examples 2 and 3, polymer nanofibers themselves melted when the polymer nanofibers prepared in the spinning step were subjected to the heat treatment. In Comparative Examples 2 and 3, the polymer solutions used in the spinning step were cloudy when prepared. In Comparative Examples 2 and 3, IR measurement of the polymer nanofibers before the heat treatment demonstrated that the fibers had a distribution difference in peaks derived from the low molecular weight organic compound contained in the polymer nanofibers. These results suggest that when the difference Δδ in average solubility parameter between the polymer and the low molecular weight organic compound was 8 $[(J/cm^3)^{1/2}]$ or more, the separation of the polymer and the low molecular weight organic compound progressed and no crosslinking was formed in the nanofibers or between the nanofibers.

When Examples (Examples 1 to 6) are compared with each other, at least some of the non-crosslinkable functional groups (non-crosslinkable parts) contained in the low molecular weight organic compound are common to functional groups contained in the repeating unit of the polymer constituting the polymer nanofibers in the Examples except Example 5. In such cases, it was ascertained that the detachment strength and the mechanical strength were further improved. Here, the functional groups (common functional groups) that are at least some of the non-crosslinkable functional groups and are contained in the repeating unit of the polymer are listed in Table 2.

TABLE 2

| Example | Common functional group |
|---|---|
| 1, 2 | Amido group, phenyl group |
| 3, 4 | Amido group |
| 5 | None |
| 6 | Phenyl group |

The evaluation of the tensile elastic modulus and the detachment strength in Examples 1 and 2 and Examples 3 and 4 reveals the following features. In other words, the polymer nanofiber sheets in Examples 1 and 2 in which the repeating unit of the polymer has an imide structure exhibited larger strength values than those of the sheets in Examples 3 and 4 in which the polymer was composed of repeating amide structures. This result suggests that when the polymer material constituting the polymer nanofibers is a polymer having an imide structure in the repeating unit, the polymer material can improve the heat resistance and the mechanical strength due to the rigid and robust molecular structure thereof. From the results of Examples 1 to 6, each of the polymer nanofiber sheets of Examples 1 and 2 was ascertained to be a polymer nanofiber sheet that was unlikely to be deformed before and after the crosslinking step and had a high specific surface area.

The polymer nanofiber sheets obtained in Examples to 6 were analyzed, indicating that the difference in solubility parameter between an unreacted low molecular weight organic compound and the crosslinked polymer was also less than 8.

As shown in each example, the polymer nanofiber sheet of the present invention was revealed to be a polymer nanofiber sheet having good detachment resistance between polymer nanofibers, a high mechanical strength, and a high specific surface area. In addition, due to these features, the polymer nanofiber sheet of the present invention has an advantage in long-term use because the polymer nanofibers constituting the polymer nanofiber sheet do not easily get loose.

The present invention has been described above in detail with reference to examples, but these examples are merely illustrative, and the present invention is not limited to these examples. In other words, the present invention naturally includes various changes and modifications of the examples exemplified above.

INDUSTRIAL APPLICABILITY

The polymer nanofiber sheet of the present invention is a polymer nanofiber sheet that is usable over a long period of time even when an external factor such as friction is applied and has a high specific surface area. On this account, the polymer nanofiber sheet can be suitably used as, for example, a triboelectric charging material in static electricity generators or apparatuses for sorting particles with an electric field. The form of use of the polymer nanofiber sheet of the present invention is not limited to particular forms and is exemplified by a form in which the sheet is wound on a roller member to be handled.

As described with reference to the embodiments and examples, the present invention can provide a polymer nanofiber sheet having high mechanical strength and detachment strength and also having a high specific surface area.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-214426, filed on Oct. 21, 2014, which is hereby incorporated by reference herein in its entirety.

What is claimed is:

1. A polymer nanofiber sheet comprising polymer nanofibers each of which comprises a polymer, the polymer nanofibers being accumulated, three-dimensionally entangled, and in contact with each other,
   wherein the polymer nanofiber sheet has a tensile elastic modulus of 100 MPa to 480 MPa,
   wherein the polymer is a polyamide, a polyamide imide, a polymethyl methacrylate, or a polyethylene terephthalate,
   wherein a low molecular weight organic compound is on a surface of respective said polymer nanofibers and in the respective said polymer nanofibers,
   wherein the polymer nanofibers are crosslinked with each other by a chemical reaction between the polymer in each of the polymer nanofibers and the low molecular weight organic compound interposed between the polymer nanofibers at a position where the polymer nanofibers are in contact with each other, and
   wherein the low molecular weight organic compound is a compound of formula (1):

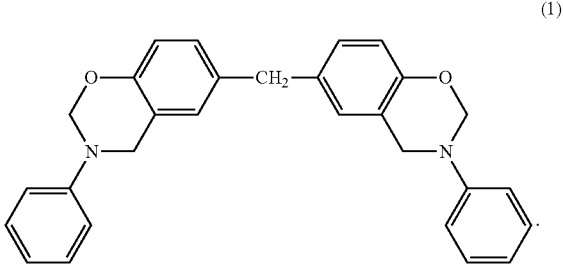 [SMILES: c1ccc(N2COc3ccc(Cc4ccc5c(c4)CN(c4ccccc4)CO5)cc3C2)cc1]

(1)

2. The polymer nanofiber sheet according to claim 1, wherein the low molecular weight organic compound is contained in an amount of 60% by weight or less with respect to a total weight of the polymer and the low molecular weight organic compound.

3. The polymer nanofiber sheet according to claim 1, wherein the polymer nanofiber sheet has a film thickness of 0.1 μm to less than 1 mm.

4. The polymer nanofiber sheet according to claim 1, wherein the polymer nanofiber sheet has pores having an average pore diameter of 10 nm to 50 μm.

5. The polymer nanofiber sheet according to claim 1, wherein the polymer nanofibers have an average diameter of 50 nm to less than 3000 nm.

* * * * *